US011460827B2

(12) United States Patent
Watanabe et al.

(10) Patent No.: US 11,460,827 B2
(45) Date of Patent: Oct. 4, 2022

(54) CONTROLLER AND MACHINE LEARNING DEVICE

(71) Applicant: Fanuc Corporation, Yamanashi (JP)

(72) Inventors: Mitsunori Watanabe, Yamanashi (JP); Takayuki Tamai, Yamanashi (JP); Kazuomi Maeda, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 1004 days.

(21) Appl. No.: 16/180,530

(22) Filed: Nov. 5, 2018

(65) Prior Publication Data
US 2019/0137969 A1 May 9, 2019

(30) Foreign Application Priority Data

Nov. 6, 2017 (JP) .............................. JP2017-213430

(51) Int. Cl.
*G05B 19/4063* (2006.01)
*G06N 20/00* (2019.01)
*G06N 5/04* (2006.01)

(52) U.S. Cl.
CPC .......... *G05B 19/4063* (2013.01); *G06N 5/04* (2013.01); *G06N 20/00* (2019.01); *G05B 2219/23246* (2013.01)

(58) Field of Classification Search
CPC ...... G05B 19/4063; G05B 2219/23246; G06N 5/04; G06N 20/00; G06N 5/045
See application file for complete search history.

(56) References Cited

U.S. PATENT DOCUMENTS

| 9,990,568 B2 * | 6/2018 | Callan .................. G06K 9/6215 |
| 2015/0248797 A1 | 9/2015 | Duggan et al. |
| 2016/0300126 A1 * | 10/2016 | Callan .................. G06K 9/6296 |

(Continued)

FOREIGN PATENT DOCUMENTS

| JP | H0486901 A | 3/1992 |
| JP | H09179438 A | 7/1997 |

(Continued)

OTHER PUBLICATIONS

Alberto, Data fusion and machine learning for industrial prognosis: Trends and perspectives towards Industry 4.0, Information Fusion 50 (2019) 92-111 (Year: 2019).*

(Continued)

*Primary Examiner* — Tung S Lau
(74) *Attorney, Agent, or Firm* — RatnerPrestia

(57) ABSTRACT

In a controller and a machine learning device capable of suppressing an influence of an abnormal value based on noise, etc., the machine learning device included in the controller includes a state observation unit for acquiring input data including at least one of internal data and external data of the manufacturing machine controlled by the controller, an input safety circuit for detecting an abnormality in the input data and outputting safe input data, a machine learning unit for executing learning of a learning model and inference using the learning model based on the safe input data and outputting inference data as an inference result, an output safety circuit for detecting an abnormality in the inference data and outputting safe inference data, and an output unit for outputting output data based on the safe inference data.

8 Claims, 5 Drawing Sheets

(56) References Cited

U.S. PATENT DOCUMENTS

2017/0060104 A1 3/2017 Genma
2017/0091667 A1 3/2017 Yukawa
2017/0357243 A1* 12/2017 Takayama ................ G06N 3/08

FOREIGN PATENT DOCUMENTS

| JP | 2003019742 A | 1/2003 |
| JP | 2005222444 A | 8/2005 |
| JP | 2008256673 A | 10/2008 |
| JP | 2009237832 A | 10/2009 |
| JP | 2016540190 A | 12/2016 |
| JP | 2017-45300 A | 3/2017 |
| JP | 2017-68566 A | 4/2017 |
| JP | 2017151722 A | 8/2017 |
| JP | 2017181138 A | 10/2017 |

OTHER PUBLICATIONS

Rajesh Gupta, Machine Learning Models for Secure Data Analytics: A taxonomy and threat model, Computer Communications 153 (2020) 406-440 (Year: 2020).*
Thyago, A systematic literature review of machine learning methods applied to predictive maintenance, Computers & Industrial Engineering 137 (2019) 106024 (Year: 2019).*
Notice of Reasons for Refusal for Japanese Application No. 2017-213430, dated Jun. 30, 2020, with translation, 14 pages.
Notice of Reasons for Refusal for Japanese Application No. 2017-213430, dated Oct. 8, 2019, with translation, 10 pages.

* cited by examiner

CONTROLLER AND MACHINE LEARNING DEVICE

CROSS-REFERENCE TO RELATED APPLICATION

This application is a new U.S. Patent Application that claims benefit of Japanese Patent Application No. 2017-213430 flied Nov. 6, 2017, the disclosure of this application is being incorporated herein by reference in its entirety for all purposes.

BACKGROUND OF THE INVENTION

1. Field of the Invention

Embodiments relate to a controller and a machine learning device.

2. Description of the Related Art

A function of performing machine control by various inferences based on measurement data including internal data of a controller, which controls a manufacturing machine such as a machine tool, an injection molding machine, or a robot installed in a factory environment, has been used by incorporating a machine learning device, which performs machine learning using the measurement data including the internal data of the controller, in the controller. The machine learning device incorporated in the controller performs learning, inference, etc. based on various data obtainable by the controller.

For example, Japanese Patent Application Laid-Open No. 2017-68566 discloses a technology of observing both a machining error amount of a workpiece and an operation rate of a machine tool as state data in a controller that corrects a tool edge position of a tool in consideration of an influence of thermal displacement of a machine tool, and optimizing a frequency of tool correction based on the observed state data. In addition, Japanese Patent Application Laid-Open No. 2017-45300 discloses a technology of observing a detection value of each sensor included in a machine tool as state data, and adjusting a machining condition of the machine tool to an optimum machining condition in which chattering and tool wear/tool breakage do not occur based on the observed state data.

Since a factory environment in which a manufacturing apparatus operates is a harsh environment in which a lot of manufacturing machines are operating, there is a possibility that an abnormal value such as noise may be included in these data. In a case in which an abnormal value such as noise is included in input data when a machine learning device included in a controller that controls the manufacturing apparatus performs learning, a problem occurs in a learning model as a learning result by the machine learning device, and there is a possibility that an abnormal value may be output even when input data at the time of inference is correct.

In addition, in learning by machine learning, a parameter of a learning model is determined using input data. However, the parameter is probabilistically determined and is not theoretically guaranteed. Thus, even when inference is performed based on normal input data, there is a possibility that abnormal inference data may be output.

Furthermore, there is a possibility that abnormal inference data may be output due to an abnormal value such as noise included in input data corresponding to a base when a machine learning device included in a controller that controls a manufacturing apparatus performs inference, or an abnormal value such as noise may be mixed in output inference data.

SUMMARY OF THE INVENTION

Therefore, an object of embodiments is to provide a controller and a machine learning device allowing suppression of an influence of an abnormal value based on noise, etc. generated in a factory environment.

The controller of the embodiments solves the above-mentioned problem by introducing a machine learning device including a safety circuit for detecting, correcting, or reacquiring an abnormal value on at least one of an input side and an output side.

Further, an aspect of the embodiments is a controller for controlling a manufacturing machine, the controller including a machine learning device learning a state related to a manufacturing machine as an environment, in which the machine learning device includes a state observation unit for acquiring input data including at least one of internal data and external data of the manufacturing machine, an input safety circuit for detecting an abnormality in the input data and outputting safe input data, a machine learning unit for executing learning of a learning model and inference using the learning model based on the safe input data and outputting inference data as an inference result, an output safety circuit for detecting an abnormality in the inference data and outputting safe inference data, and an output unit for outputting output data based on the safe inference data.

Another aspect of the embodiments is a controller for controlling a manufacturing machine, the controller including a machine learning device learning a state related to a manufacturing machine as an environment, in which the machine learning device includes a state observation unit for acquiring input data including at least one of internal data and external data of the manufacturing machine, an input safety circuit for detecting an abnormality in the input data and outputting safe input data, a machine learning unit for executing inference using a learning model based on the safe input data and outputting inference data as an inference result, and an output unit for outputting output data based on the inference data.

Another aspect of the embodiments is a controller for controlling a manufacturing machine, the controller including a machine learning device learning a state related to a manufacturing machine as an environment, in which the machine learning device includes a state observation unit for acquiring input data including at least one of internal data and external data of the manufacturing machine, a machine learning unit for executing inference using a learning model based on the input data and outputting inference data as an inference result, an output safety circuit for detecting an abnormality in the inference data and outputting safe inference data, and an output unit for outputting output data based on the safe inference data.

Another aspect of the embodiments is a controller for controlling a manufacturing machine, the controller including a machine learning device learning a state related to a manufacturing machine as an environment, in which the machine learning device includes a state observation unit for acquiring input data including at least one of internal data and external data of the manufacturing machine, an input safety circuit for detecting an abnormality in the input data and outputting safe input data, and a machine learning unit for executing learning of a learning model based on the safe input data.

Another aspect of the embodiments is a machine learning device learning a state related to a manufacturing machine as an environment, the machine learning device including a state observation unit for acquiring input data including at least one of internal data and external data of the manufacturing machine, an input safety circuit for detecting an abnormality in the input data and outputting safe input data, a machine learning unit for executing learning of a learning model and inference using the learning model based on the safe input data and outputting inference data as an inference result, an output safety circuit for detecting an abnormality in the inference data and outputting safe inference data, and an output unit for outputting output data based on the safe inference data.

Another aspect of the embodiments is a machine learning device learning a state related to a manufacturing machine as an environment, the machine learning device including a state observation unit for acquiring input data including at least one of internal data and external data of the manufacturing machine, an input safety circuit for detecting an abnormality in the input data and outputting safe input data, a machine learning unit for executing inference using a learning model based on the safe input data and outputting inference data as an inference result, and an output unit for outputting output data based on the inference data.

Another aspect of the embodiments is a machine learning device learning a state related to a manufacturing machine as an environment, the machine learning device including a state observation unit for acquiring input data including at least one of internal data and external data of the manufacturing machine, a machine learning unit for executing inference using a learning model based on the input data and outputting inference data as an inference result, an output safety circuit for detecting an abnormality in the inference data and outputting safe inference data, and an output unit for outputting output data based on the safe inference data.

Another aspect of the embodiments is a machine learning device learning a state related to a manufacturing machine as an environment, the machine learning device including a state observation unit for acquiring input data including at least one of internal data and external data of the manufacturing machine, an input safety circuit for detecting an abnormality in the input data and outputting safe input data, and a machine learning unit for executing learning of a learning model based on the safe input data.

According to the embodiments, normal data may be used without change by detecting/correcting/reacquiring an abnormal value at the time of inputting data to a machine learning device, and it is possible to suppress an influence of the abnormal value to the minimum. In addition, a highly accurate learning result is obtained by excluding an abnormal value from learning data. Further, it is possible to surely prevent an obviously unintended output by detecting/correcting an abnormal value at the time of output, it is possible to safely use a result of machine learning even when learning is insufficient or abnormal, and it is possible to prevent output of an abnormal value even when internal abnormality occurs in the machine learning device, etc.

BRIEF DESCRIPTION OF THE DRAWINGS

The above-described object and characteristic of embodiments and other objects and characteristics will be clear from description of embodiments below with reference to accompanying drawings. In the drawings.

DETAILED DESCRIPTION OF THE PREFERRED EMBODIMENTS

Hereinafter, a configuration example of a controller for realizing embodiments will be shown.

Figure 1:
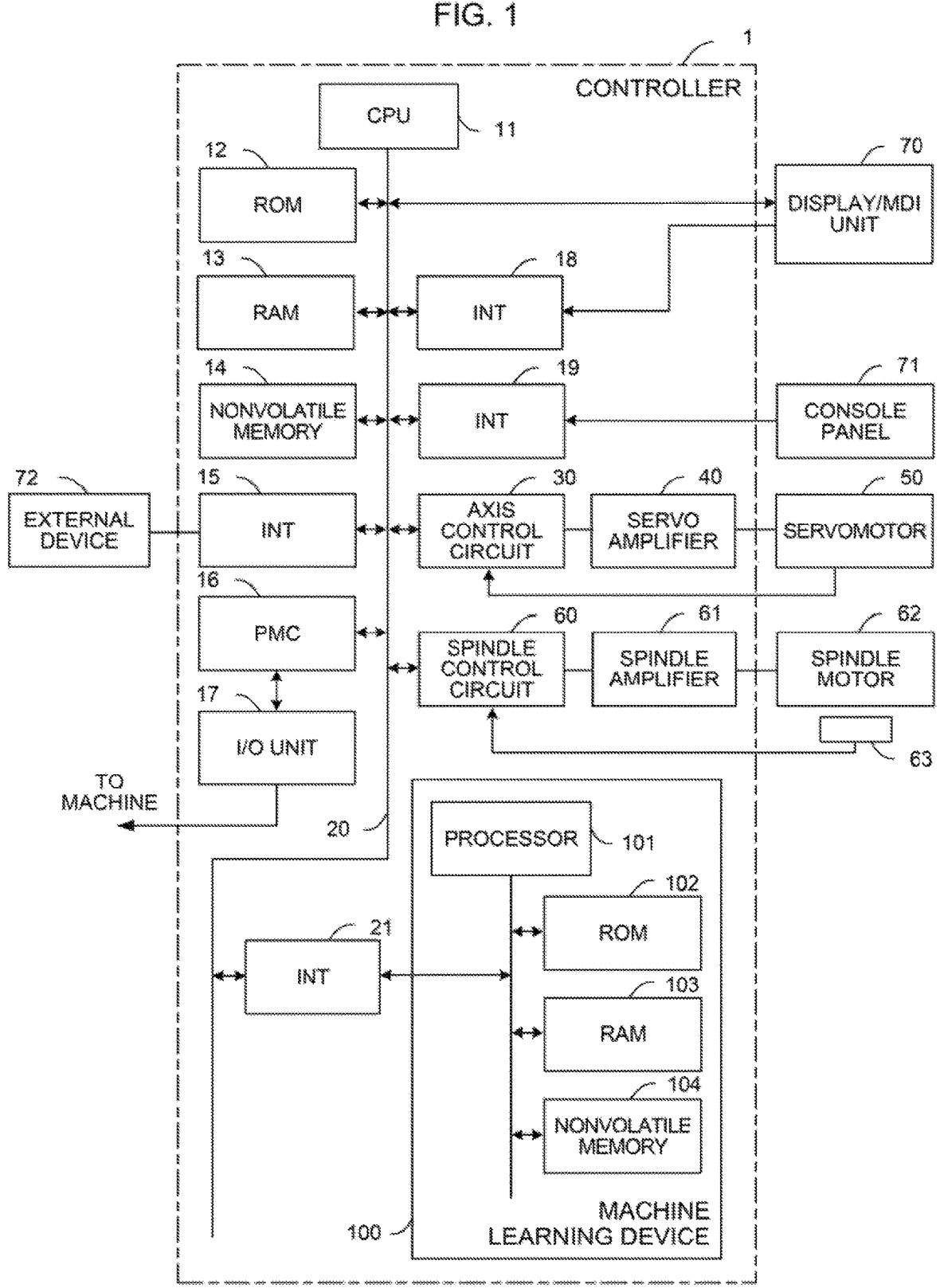
FIG. 1 is a schematic hardware configuration diagram illustrating a main part of a controller according to an embodiment.

FIG. 1 is a schematic hardware configuration diagram illustrating a main part of a controller according to a first embodiment. The present embodiment shows an example in which a machine learning device 100 is incorporated in a controller 1 that controls a manufacturing machine (not illustrated) machining a workpiece. However, the machine learning device 100 may be mounted as a part of a computer included in a manufacturing system installed in a factory such as a cell computer, a host computer, or a cloud server.

A central processing unit (CPU) 11 included in the controller 1 according to the present embodiment is a processor that controls the controller 1 as a whole. The CPU 11 reads a system program stored in a read only memory (ROM) 12 via a bus 20, and controls the entire controller 1 according to the system program. A random access memory (RAM) 13 temporarily stores temporary calculation data or display data, various data input by an operator via an input unit (not illustrated), etc.

For example, a nonvolatile memory 14 is configured as a memory that is kept in a storage state even when a power source of the controller 1 is turned OFF by being backed up by a battery (not illustrated). The nonvolatile memory 14 stores a program read via an interface 15, a program input via a display/manual data input (MDI) unit 70 described below, etc. The program stored in the nonvolatile memory 14 may be loaded in the RAM 13 during use. In addition, various system programs (including a system program for controlling exchange with the machine learning device 100) necessary for operation of the controller 1 are written to the ROM 12 in advance.

The interface 15 is an interface for connecting the controller 1 and an external device 72 such as an adapter to each other. A program, various parameters, etc. are read from the external device 72 side. In addition, a program edited in the controller 1, various parameters, etc. can be stored in external storage means via the external device 72. A programmable machine controller (PMC) 16 outputs a signal to a peripheral device (for example, an actuator such as a robot hand for tool change) of the manufacturing machine via an input/output (I/O) unit 17 by a sequence program built in the controller 1 to perform a control operation. In addition, the PMC 16 receives signals of various switches, etc. of a console panel provided in a main body of the manufacturing machine, performs necessary signal processing, and then delivers the signals to the CPU 11.

The display/MDI unit 70 is a manual data input device including a display, a keyboard, etc., and an interface 18 receives a command and data from the keyboard of the display/MDI unit 70 and delivers the received command and data to the CPU 11. An interface 19 is connected to a console panel 71 including a manual pulse generator, etc. used for manually driving each axis.

An axis control circuit 30 for controlling an axis included in the manufacturing machine receives a movement command amount of the axis from the CPU 11 and outputs a command of the axis to a servo amplifier 40. The servo amplifier 40 receives this command and drives a servomotor 50 that moves the axis included in the manufacturing machine. The servomotor 50 of the axis incorporates a position/speed detector, and feeds back a position/speed feedback signal from this position/speed detector to the axis control circuit 30, thereby performing feedback control of a position/speed.

In the hardware configuration diagram of FIG. 1, only one axis control circuit 30, one servo amplifier 40, and one servomotor 50 are illustrated. However, in practice, each of the number of axis control circuits, the number of servo amplifiers, and the number of servomotors to be prepared corresponds to the number of axes included in the manufacturing machine to be controlled.

A spindle control circuit 60 receives a spindle rotation command to the manufacturing machine and outputs a spindle speed signal to a spindle amplifier 61. The spindle amplifier 61 receives this spindle speed signal, and rotates a spindle motor 62 of the manufacturing machine at a commanded rotation speed to drive a tool.

A position coder 63 is coupled to the spindle motor 62, the position coder 63 outputs a feedback pulse in synchronization with rotation of a spindle, and the feedback pulse is read by the CPU 11.

An interface 21 is an interface for connecting the controller 1 and the machine learning device 100 to each other. The machine learning device 100 includes a processor 101 that controls the entire machine learning device 100, a ROM 102 that stores a system programs, etc., a RAM 103 that performs temporary storage in each process related to machine learning, and a nonvolatile memory 104 used for storing a learning model, etc. The machine learning device 100 can observe each piece of information (for example, a movement command amount and a position command value of an axis output from the CPU 11 to the axis control circuit 30, a position/speed feedback value obtained from the servomotor 50, etc.) obtainable by the controller 1 via the interface 21. In addition, for example, the controller 1 performs thermal displacement correction, etc. related to the manufacturing machine to be controlled based on a value output from the machine learning device 100.

Figure 2:
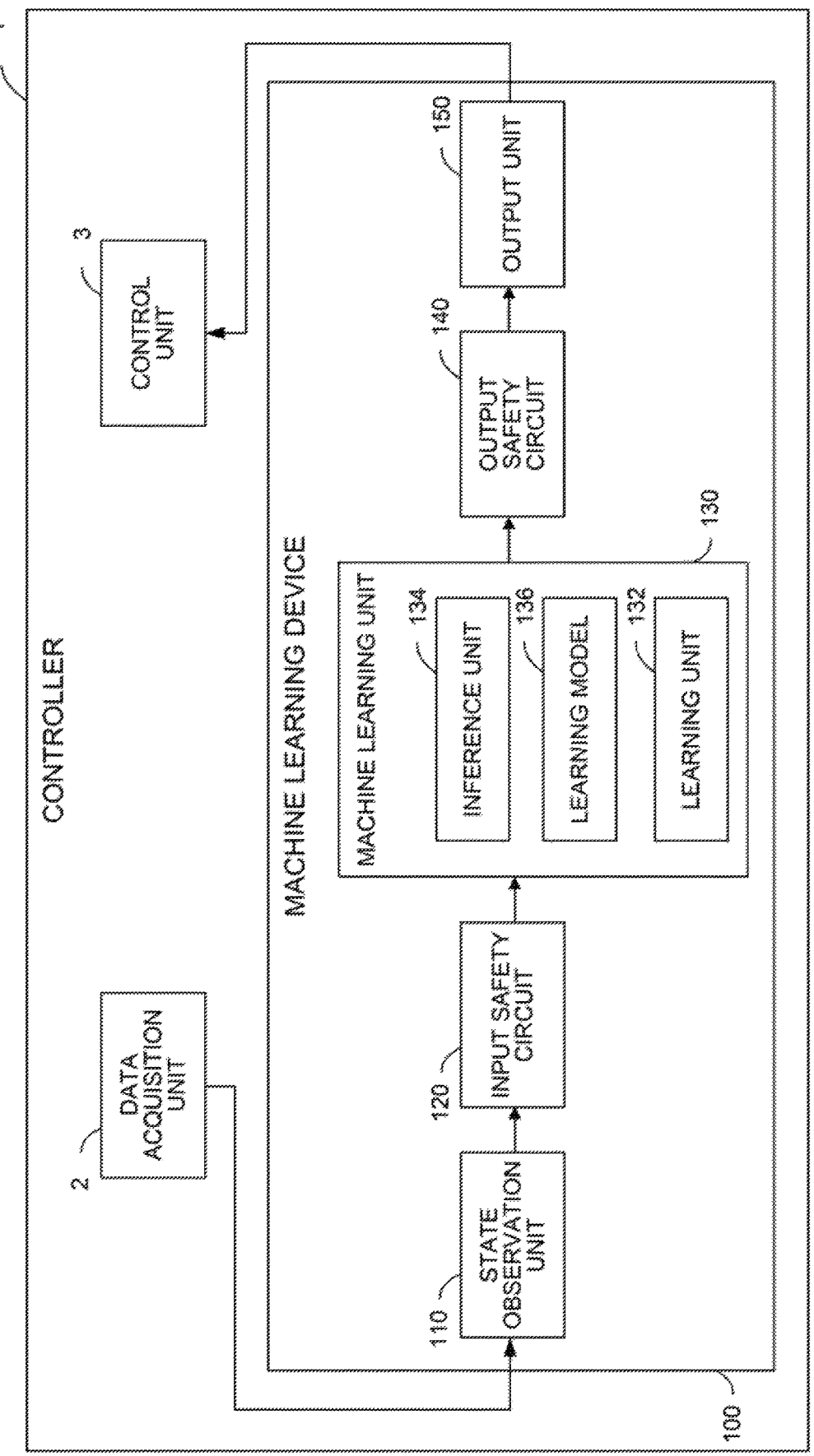
FIG. 2 is a schematic function block diagram of the controller according to the embodiment.

FIG. 2 is a schematic function block diagram illustrating a main part of the controller according to the embodiment. Each function block illustrated in FIG. 2 is realized by each of the CPU 11 included in the controller 1 illustrated in FIG. 1 and the processor 101 of the machine learning device 100 executing a system program to control an operation of each unit of the controller 1 and the machine learning device 100. The controller 1 of the present embodiment includes a data acquisition unit 2 and a control unit 3.

The data acquisition unit 2 is functional means that acquires data including at least one of internal data and external data indicating an environment from a manufacturing machine or a factory corresponding to an environment for the machine learning device 100. For example, the data acquisition unit 2 acquires data of a current value of the servomotor 50 or the spindle motor 62 driving each unit of the manufacturing machine controlled by the controller 1, a detection value of a temperature, vibration, etc. detected by a sensor installed in each unit of the manufacturing machine, etc.

The control unit 3 is functional means that controls the manufacturing machine, etc. based on a parameter set in the controller 1, a program (not illustrated) stored in the nonvolatile memory 14, and an inference value output from the machine learning device 100. For example, the control unit 3 performs control of the servomotor 50 by the axis control circuit 30 or the servo amplifier 40, control of the spindle motor 62 by the spindle control circuit 60 or the spindle amplifier 61, control of display on the display/MDI unit 70, etc.

Meanwhile, the machine learning device 100 included in the controller 1 of the present embodiment includes a state observation unit 110, an input safety circuit 120, a machine learning unit 130, an output safety circuit 140, and an output unit 150, and the machine learning unit 130 includes a learning unit 132, an inference unit 134, and a learning model 136.

The state observation unit 110 is functional means that observes input data such as state data indicating a state of the environment, label data, determination data, etc. from data acquired by the data acquisition unit 2. The input data observed by the state observation unit 110 is used in learning by the learning unit 132 and inference by the inference unit 134 and varies depending on the structure of the learning model 136. For example, when the learning model 136 is a learning model for so-called unsupervised learning, the state observation unit 110 observes state data for learning by the learning unit 132 and inference by the inference unit 134 as input data. Further, for example, when the learning model 136 is a learning model for so-called supervised learning, the state observation unit 110 observes state data and label data as input data for learning by the learning unit 132, and observes state data as input data for inference by the inference unit 134. In addition, for example, when the learning model 136 is a learning model for so-called reinforcement learning, the state observation unit 110 observes state data and determination data as input data for learning by the learning unit 132, and observes state data as input data for inference by the inference unit 134.

The input safety circuit 120 is functional means that detects an abnormal value of input data observed by the state observation unit 110 and input to the machine learning unit 130, executes an operation at the time of detecting an abnormal value when the abnormal value of the input data is detected, and outputs the input data as safety measurement data to the machine learning unit 130 when the abnormal value of the input data is not detected. For example, the input safety circuit 120 may record a history of acquired input data, and perform outlier detection using a known scheme such as a statistical scheme of a normal distribution, etc., a scheme using a distance such as a Mahalanobis distance, clustering, or density ratio estimation, thereby detecting the abnormal value of the input data. In addition, the input safety circuit 120 may previously set a range of a value that can be taken by each data item of input data and determine that an abnormal value is detected when the value of each data item of the input data is out of the previously set range, may record past input data and detect an abnormal value based on a change amount, etc. of a value when viewed from the past input data or a series of the past input data (an abnormal value is set when an unacceptable change amount is detected, etc.), or may determine that an abnormal value is detected when an abnormal signal of a sensor, an error signal of a bus communication path, etc. is detected. Further, the input safety circuit 120 may be configured as a machine learning device previously learning a normal value/abnormal value of input data, and an abnormal value of input data may be detected based on a detection result of the input data by the machine learning device.

At the time of detecting an abnormal value of input data, the input safety circuit 120 executes an operation related to the input data determined in advance such as reacquisition of the input data, correction of the input data, or discard of the input data. For example, the input safety circuit 120 may execute the operation related to the input data determined in advance when a predetermined condition is satisfied. As an example, when there is a time margin for reacquiring the input data, the input safety circuit 120 may command the state observation unit 110 (furthermore, the data acquisition unit 2) to reacquire the input data. In this case, for example, when an abnormal value is continuously detected a predetermined number of times at the time of reacquiring the input data, the input safety circuit 120 may abandon reacquisition of the input data. As another example, when safety measurement data in a current operation cycle of the controller 1 is indispensable (when the machine learning device 100 needs to necessarily output safety inference data in the current operation cycle of the controller 1, etc.), the input safety circuit 120 may correct a value of a data item of input data in which an abnormal value is detected based on input data input in the past, and output the corrected input data as safety measurement data. In this case, the input safety circuit 120 may correct the value of the data item of the input data in which the abnormal value is detected based on input data input in a previous operation cycle (the abnormal value of the data item is set to the same value as that of the previous cycle), or correct the value of the data item of the input data in which the abnormal value is detected based on a change tendency of each data item of input data input in the past, etc. As still another example, when safety measurement data in a current operation cycle of the controller 1 is not indispensable, the input safety circuit 120 may discard input data.

When an abnormal value is detected in input data, the input safety circuit 120 may make the operation different between input data for learning by the learning unit 132 and input data for inference by the inference unit 134. For example, learning by the abnormal value may not be performed while continuing the operation of the controller 1 by delivering input data in which the abnormal value is corrected to the inference unit 134 as safety measurement data and discarding the input data in which the abnormal value is detected with respect to the learning unit 132.

When an abnormal value of input data is detected, the input safety circuit 120 may record that the input data corresponds to the abnormal value. In addition, when an abnormal value of input data is detected, the input safety circuit 120 may notify the display/MDI unit 70, etc. that the abnormal value is detected.

The learning unit 132 included in the machine learning unit 130 is functional means that executes learning of the learning model 136 based on the safety measurement data output from the input safety circuit 120. The learning unit 132 updates the learning model 136 by performing learning according to an algorithm of the learning model 136 based on the safety measurement data. The learning unit 132 may switch ON/OFF a learning process by manipulation of a worker of a manufacturer or an operator, etc. In addition, the learning unit 132 may not be an indispensable configuration of the machine learning device 100 after learning of the learning model 136 is completed. For example, when the manufacturer ships the controller 1 to a customer, management using only an inference function may be performed without causing extra learning at a factory of the customer by incorporating only the inference unit 134 and the learning model 136 as the machine learning unit 130 and performing shipping.

The inference unit 134 included in the machine learning unit 130 is functional means that performs an inference process using the learning model 136 based on the safety measurement data output from the input safety circuit 120. The inference unit 134 outputs a result of the inference process using the learning model 136 to the output safety circuit 140 as inference data. The inference unit 134 may switch ON/OFF the inference process by manipulation of a worker of a manufacturer or an operator, etc. In addition, the inference unit 134 may not be an indispensable configuration of the machine learning device 100 at a learning stage of the learning model 136.

The output safety circuit 140 is functional means that detects an abnormal value of inference data output from the machine learning unit 130, executes an operation at the time of detecting an abnormal value when the abnormal value of the inference data is detected, and outputs the inference data as safety inference data to the output unit 150 when the abnormal value of the inference data is not detected. For example, the output safety circuit 140 may record a history of acquired inference data, and perform outlier detection using a known scheme such as a statistical scheme of a normal distribution, etc., a scheme using a distance such as a Mahalanobis distance, clustering, or density ratio estimation, thereby detecting the abnormal value of the inference data. In addition, the output safety circuit 140 may previously set a range of a value that can be taken by each data item of inference data and determine that an abnormal value is detected when the value of each data item of the inference data is out of the previously set range, or may record past inference data and detect an abnormal value based on a change amount, etc. of a value when viewed from the past inference data or a series of the past inference data (an abnormal value is set when an unacceptable change amount is detected, etc.). Further, the output safety circuit 140 may be configured as a machine learning device previously learning a normal value/abnormal value of inference data, and an abnormal value of inference data may be detected based on a detection result of the inference data by the machine learning device.

At the time of detecting an abnormal value of inference data, the output safety circuit 140 executes an operation related to the inference data determined in advance such as correction of the inference data or discard of the inference data. For example, the output safety circuit 140 may execute the operation related to the inference data determined in advance when a predetermined condition is satisfied. As an example, when safety inference data in a current operation cycle of the controller 1 is indispensable (when the machine learning device 100 needs to necessarily output safety inference data in the current operation cycle of the controller 1, etc.), the output safety circuit 140 may correct a value of a data item of inference data in which an abnormal value is detected based on inference data inferred in the past, and output the corrected inference data as safety inference data. In this case, the output safety circuit 140 may correct the value of the data item of the inference data in which the abnormal value is detected based on inference data inferred in a previous operation cycle (the abnormal value of the data item is set to the same value as that of the previous cycle), or correct the value of the data item of the inference data in which the abnormal value is detected based on a change tendency, etc. of each data item of inference data inferred in the past. As still another example, the output safety circuit 140 may notify an alarm to the controller 1 via the output unit 150 after discarding the inference data in which the abnormal value is detected. In addition, at the time of detecting an abnormal value of inference data, the output safety circuit 140 may record that the inference data corresponds to the abnormal value.

The output unit 150 is functional means that outputs the safety inference data output by the output safety circuit 140 to the control unit 3 of the controller. The output unit 150 carries out a role as an output interface from the machine learning device 100 to the controller 1, such as converting the safety inference data into a format that can be interpreted by the control unit 3 as necessary.

Figure 3:
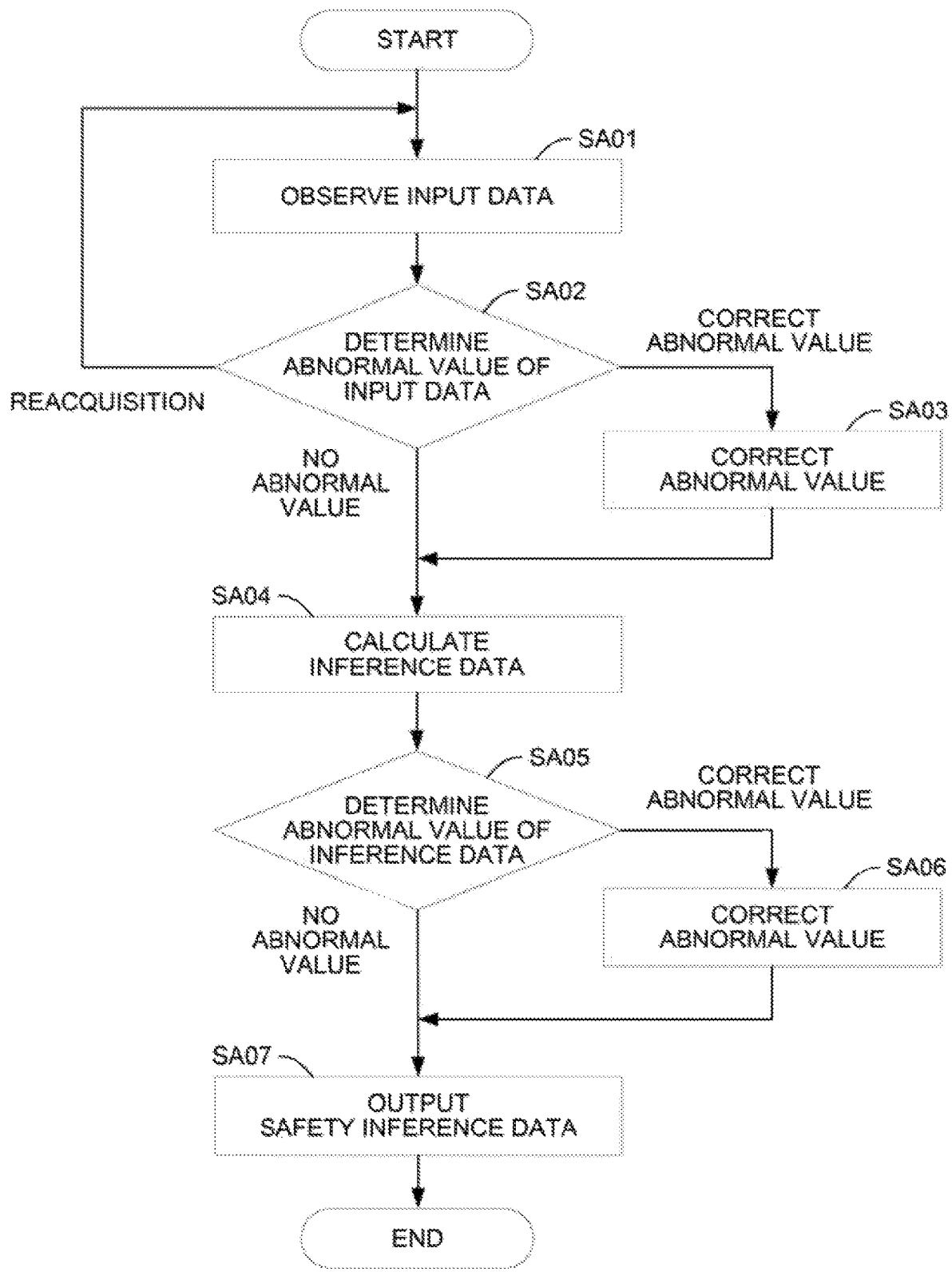
FIG. 3 is a flowchart of processing executed by a machine learning device included in the controller according to the embodiment.

FIG. 3 is a schematic flowchart of a process executed on the machine learning device 100 illustrated in FIGS. 1 and 2. In the flowchart illustrated in FIG. 3, it is presumed that an operation of each circuit is defined such that reacquisition of input data or correction of an abnormal value is performed when the abnormal value is detected by the input safety circuit 120 and an abnormal value of inference data is corrected when the abnormal value is detected by the output safety circuit 140. However, for example, an alert may be output to suspend the operation of the controller 1 when the abnormal value is detected by the input safety circuit 120 and the output safety circuit 140.

[Step SA01] The state observation unit 110 observes input data indicating a state of an environment via the controller 1.

[Step SA02] The input safety circuit 120 detects whether an abnormal value is not present in the input data.

The process proceeds to step SA01 when the abnormal value is present and input data is reacquired, and the process proceeds to step SA03 when the abnormal value is present in the input data and the abnormal value is corrected. In addition, when an abnormal value is not detected from the input data, the process proceeds to step SA04.

[Step SA03] The input safety circuit 120 corrects the abnormal value of the input data.

[Step SA04] The inference unit 134 included in the machine learning unit 130 performs inference using the learning model 136 based on the safety measurement data output from the input safety circuit 120 and calculates inference data.

[Step SA05] The output safety circuit 140 detects whether an abnormal value is not present in the inference data.

When the abnormal value is present, the process proceeds to step SA06. In addition, when the abnormal value is not detected from the inference data, the process proceeds to step SA07.

[Step SA06] The output safety circuit 140 corrects the abnormal value of the inference data.

[Step SA07] The output unit 150 outputs output data based on safety inference data corresponding to inference data having no abnormal value from the machine learning device 100. As an application example of the controller of the present embodiment, it is conceivable to use the machine learning device 100 for correcting the thermal displacement amount of the manufacturing machine controlled by the controller 1. In this case, an environment learned by the machine learning device 100 is the manufacturing machine (machine tool, etc.). As input data, a temperature of the manufacturing machine and a speed, a current value, etc. of the servomotor 50 and the spindle motor 62 are set as state data, and a thermal displacement amount measured from the manufacturing machine or a workpiece, etc. after machining is observed as label data. The machine learning device 100 performs learning based on these input data. Then, after learning of the learning model 136 by the learning unit 132 is sufficiently performed, the temperature of the manufacturing machine and the speed, the current value, etc. of the servomotor 50 and the spindle motor 62 as the state data are set as input data, an inference result by the inference unit 134 using the learning model 136 based on the input data is output as a predicted value of the thermal displacement amount, and the control unit 3 performs thermal displacement correction based on the predicted value of the thermal displacement amount.

According to the application example, even when an abnormal value based on noise, etc. in a detection value detected from the manufacturing machine installed in the factory environment is mixed in input data, the abnormal value is excluded by the input safety circuit 120 and is not used for learning or inference. In addition, when an abnormal value is mixed in a thermal displacement amount obtained by inference, the abnormal value is excluded by the output safety circuit 140, and it is possible to prevent a machining failure, tool damage, etc. by thermal displacement correction based on the erroneous thermal displacement amount. As described above, in the application example, it is possible to perform highly accurate machining by correction while preventing a machining defect due to an abnormal value. In particular, since the thermal displacement amount has a tendency in which a displacement amount of each part of the machine gradually changes due to heat, an abruptly generated outlier is likely to be detected as an abnormal value, and thus the input safety circuit 120 and the output safety circuit 140 may be expected as effective application examples.

As another application example of the controller of the present embodiment, it is conceivable to use the machine learning device 100 for suppressing chattering or tool wear/damage of the manufacturing machine controlled by the controller 1. In this case, an environment learned by the machine learning device 100 is the manufacturing machine (machine tool, etc.). As input data, mechanical vibration, chatter noise, a tool wear/damage state, a state of a machined surface, etc. are set as state data, and a machining speed, occurrence of chatter noise, occurrence of tool wear/damage, quality of the machined surface, etc. are observed as determination data. The machine learning device 100 performs learning based on these input data. Then, after learning of the learning model 136 by the learning unit 132 is sufficiently performed, the mechanical vibration, the chatter noise, the tool wear/damage state, the state of the machined surface, etc. as the state data are set as input data, an inference result of an appropriate machining condition adjustment behavior by the inference unit 134 using the learning model 136 based on the input data is output, and the control unit 3 adjusts a machining condition of the manufacturing machine based on the inference result of the machining condition adjustment behavior.

According to the application example, even when an abnormal value based on noise, etc. in a detection value detected from the manufacturing machine installed in the factory environment is mixed in input data, the abnormal value is excluded by the input safety circuit 120 and is not used for learning or inference. In addition, when an abnormal value is mixed in adjustment of a machining condition obtained by inference, the abnormal value is excluded by the output safety circuit 140, and it is possible to prevent a machining failure, tool damage, etc. by adjustment of the erroneous machining condition. As described above, in the application example, it is possible to perform highly accurate machining by correction while preventing a machining defect due to an abnormal value.

Figure 4:
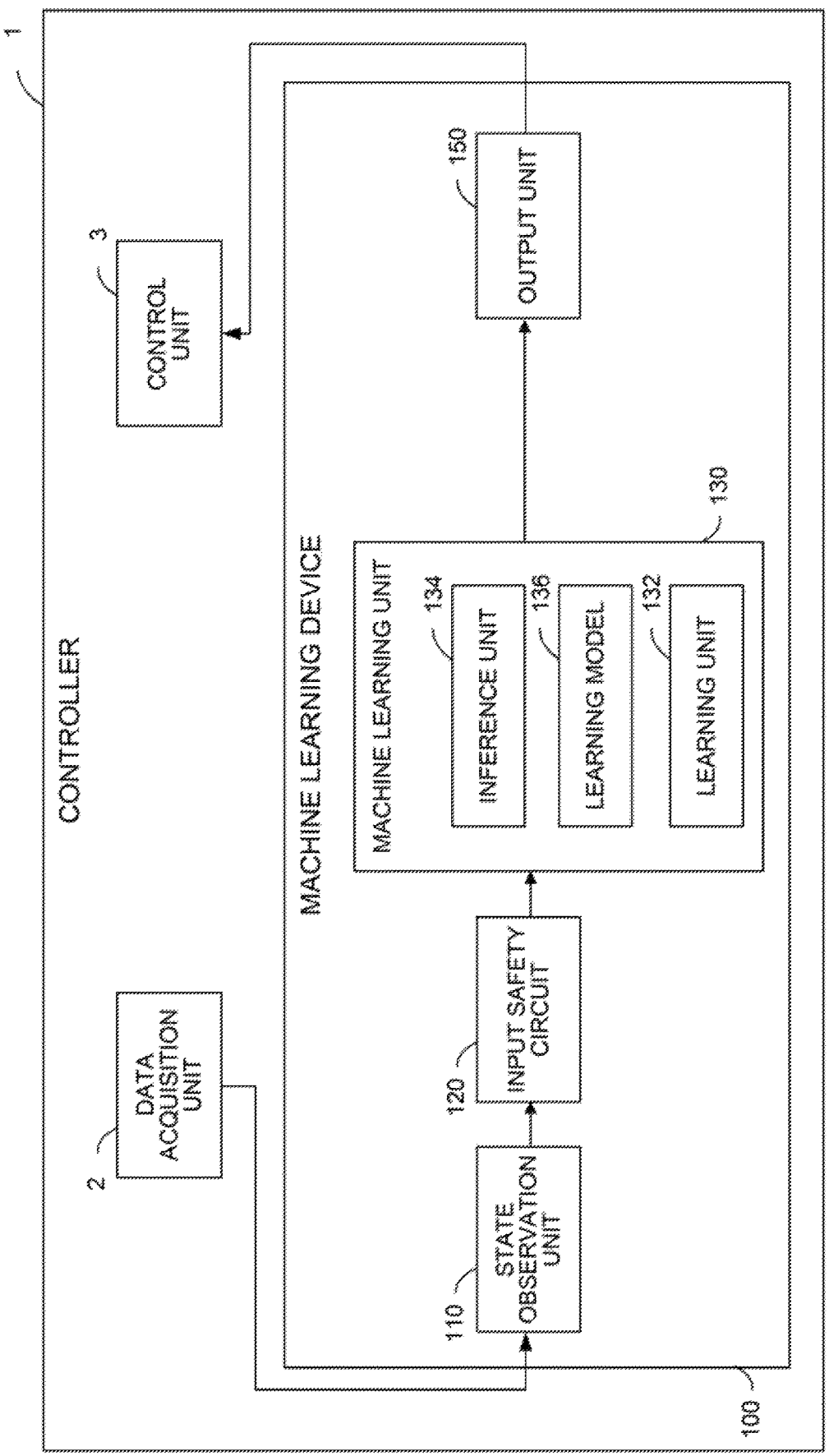
FIG. 4 is a diagram illustrating a modification of the controller.
Figure 5:
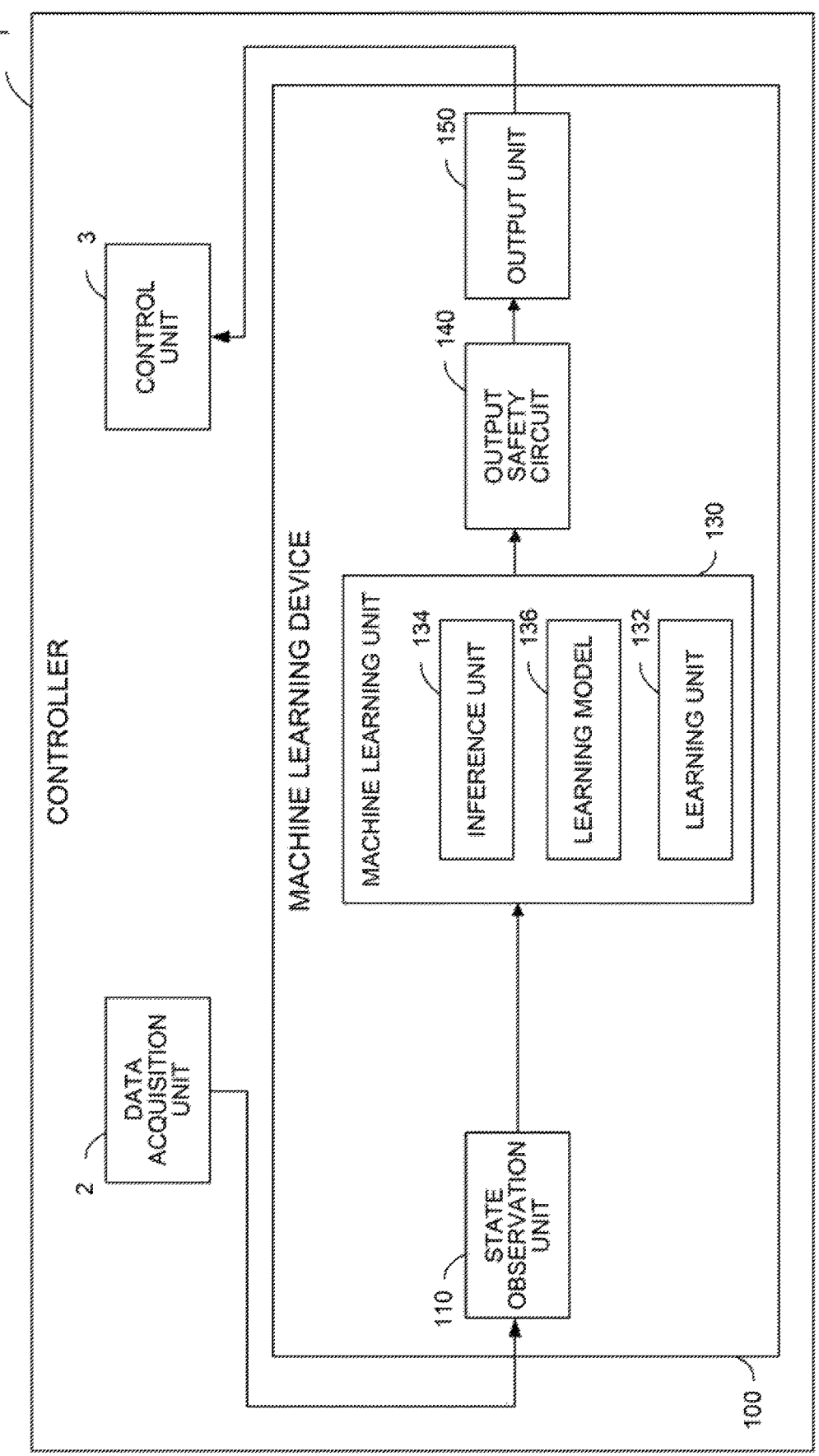
FIG. 5 is a diagram illustrating another modification of the controller.

As a modification of the controller of the present embodiment, it is possible to use the machine learning device 100 in which the output safety circuit 140 is omitted as illustrated in FIG. 4, or use the machine learning device 100 in which the input safety circuit 120 is omitted as illustrated in FIG. 5. In the modification illustrated in FIG. 4, even though an abnormal value mixed in inference data on an output side may not be excluded, it is possible to properly deal with an abnormal value of input data. Thus, it is possible to perform learning of the learning model 136 using safe input data, and it is possible to exclude a possibility that an abnormal value may be included in an inference result by the inference unit 134 to some extent. In addition, in the modification illustrated in FIG. 5, even though an abnormal value mixed in input data on an input side may not be excluded, it is possible to properly deal with an abnormal value of inference data on the output side. Thus, it is possible to surely suppress a malfunction of the manufacturing machine when an abnormal value is mixed.

Even though the embodiment has been described above, the embodiments are not limited only to the example of the above-described embodiment, and can be implemented in various modes by making appropriate changes.

For example, any generally known algorithm may be adopted as a learning algorithm executed by the machine learning device 100, an arithmetic algorithm executed by the machine learning device 100, etc.

In the above-described embodiment, the controller 1 and the machine learning device 100 are described as devices having different CPUs (processors). However, the machine learning device 100 may be realized by the CPU 11 included in the controller 1 and the system program stored in the ROM 12.

In addition, the machine learning device 100 may not be built in the controller 1, and the controller 1 and the machine learning device 100 may be separately disposed as long as the controller 1 and the machine learning device 100 are connected to each other by some communication means.

Even though the embodiment has been described above, the embodiments are not limited to the example of the above-described embodiment, and can be implemented in various modes by making appropriate changes.

The invention claimed is:

1. A controller for controlling a manufacturing machine, the controller comprising
   a machine learning device learning a state related to a manufacturing machine as an environment,
   wherein the machine learning device includes
   a state observation unit for acquiring input data including at least one of internal data and external data of the manufacturing machine,
   an input safety circuit for detecting an abnormality in the input data and outputting safe input data,
   a machine learning unit for executing inference using a learning model based on the safe input data and outputting inference data as an inference result,
   an output safety circuit for detecting an abnormality in the inference data and outputting safe inference data, and
   an output unit for outputting output data based on the safe inference data.

2. The controller according to claim 1, wherein the machine learning unit executes learning of the learning model based on the safe input data.

3. The controller according to claim 1, wherein the machine learning unit executes learning of the learning model based on the input data.

4. The controller according to claims 1, wherein the input safety circuit uses machine learning means for detection of an abnormal value.

5. The controller according to claim 1, wherein the output safety circuit uses machine learning means for detection of an abnormal value.

6. A machine learning device learning a state related to a manufacturing machine as an environment, the machine learning device comprising:
   a state observation unit for acquiring input data including at least one of internal data and external data of the manufacturing machine,
   an input safety circuit for detecting an abnormality in the input data and outputting safe input data,
   a machine learning unit for executing inference using a learning model based on the safe input data and outputting inference data as an inference result,
   an output safety circuit for detecting an abnormality in the inference data and outputting safe inference data, and
   an output unit for outputting output data based on the safe inference data.

7. The machine learning device according to claim 6, wherein the machine learning unit executes learning of the learning model based on the safe input data.

8. The machine learning device according to claim 6, wherein the machine learning unit executes learning of the learning model based on the input data.

* * * * *